US011191202B2

(12) United States Patent
Henry (10) Patent No.: US 11,191,202 B2
(45) Date of Patent: Dec. 7, 2021

(54) SYSTEM AND METHOD FOR DE-PLUGGING ROTATING GROUND ENGAGING TOOLS OF AN AGRICULTURAL IMPLEMENT

(71) Applicant: CNH Industrial Canada, Ltd., Saskatoon (CA)

(72) Inventor: James W. Henry, Saskatoon (CA)

(73) Assignee: CNH Industrial Canada, Ltd., Saskatoon (CA)

(*) Notice: Subject to any disclaimer, the term of this patent is extended or adjusted under 35 U.S.C. 154(b) by 192 days.

(21) Appl. No.: 16/539,059

(22) Filed: Aug. 13, 2019

(65) Prior Publication Data

US 2021/0045276 A1    Feb. 18, 2021

(51) Int. Cl.
| | |
|---|---|
| A01B 33/16 | (2006.01) |
| A01B 9/00 | (2006.01) |
| A01B 79/00 | (2006.01) |
| A01B 71/08 | (2006.01) |
| A01B 15/16 | (2006.01) |
| A01B 33/02 | (2006.01) |

(52) U.S. Cl.
CPC .............. *A01B 33/16* (2013.01); *A01B 9/003* (2013.01); *A01B 15/16* (2013.01); *A01B 71/08* (2013.01); *A01B 79/005* (2013.01); *A01B 33/024* (2013.01)

(58) Field of Classification Search
CPC ....... A01B 35/28; A01B 33/16; A01B 33/024; A01B 9/003; A01B 71/08; A01B 15/16; A01B 19/10; A01B 23/06; A01B 63/008; A01B 63/112; A01B 79/00; A01B 49/02
See application file for complete search history.

(56) References Cited

U.S. PATENT DOCUMENTS

| | | | |
|---|---|---|---|
| 4,653,253 A * | 3/1987 | Voler | A01D 75/18 56/12.8 |
| 8,326,500 B2 * | 12/2012 | Mariman | A01C 5/068 701/50 |
| 8,408,149 B2 | 4/2013 | Rylander | |
| 8,408,324 B2 | 4/2013 | Dillon | |
| 8,430,179 B2 | 4/2013 | Van Buskirk et al. | |

(Continued)

FOREIGN PATENT DOCUMENTS

| | | |
|---|---|---|
| DE | 102017112224 A1 | 12/2018 |
| WO | WO2013118085 | 8/2013 |

*Primary Examiner* — Jessica H Lutz
(74) *Attorney, Agent, or Firm* — Rebecca L. Henkel; Rickard K. DeMille (57) ABSTRACT

A system for de-plugging rotating ground engaging tools of an agricultural implement includes first and second ground engaging tools spaced apart from each other such that a flow gap is defined between the tools, a rotational actuator configured to rotationally drive the tools about a rotational axis, a sensor configured to capture data indicative of material accumulation within the flow gap defined between the tools, and a controller configured to determine when the tools are experiencing a plugged condition based on the data received from the sensor. Additionally, in response to the determination that the tools are experiencing the plugged condition, the controller is further configured to control an operation of the rotational actuator such that the tools are rotationally driven while such tools are disposed at a working position relative to a soil surface of a field.

17 Claims, 5 Drawing Sheets

(56) References Cited

U.S. PATENT DOCUMENTS

| | | | |
|---|---|---|---|
| 8,490,371 B2* | 7/2013 | Roberge | A01D 34/665 |
| | | | 56/10.2 R |
| 9,107,337 B2 | 8/2015 | Bassett | |
| 9,241,440 B2* | 1/2016 | Roberge | A01D 41/141 |
| 9,405,039 B2 | 8/2016 | Anderson | |
| 9,485,900 B2 | 11/2016 | Connell et al. | |
| 9,968,030 B2 | 5/2018 | Kowalchuk et al. | |
| 10,231,371 B2 | 3/2019 | Dillon | |
| 2012/0095652 A1* | 4/2012 | Anderson | G06F 7/00 |
| | | | 701/50 |
| 2013/0293167 A1* | 11/2013 | Harris, III | H02P 5/50 |
| | | | 318/400.13 |
| 2015/0296701 A1* | 10/2015 | Anderson | A01B 79/00 |
| | | | 172/2 |
| 2017/0112043 A1 | 4/2017 | Nair et al. | |
| 2018/0206393 A1 | 7/2018 | Stoller et al. | |
| 2018/0352718 A1* | 12/2018 | Kovach | A01B 49/027 |
| 2020/0128719 A1* | 4/2020 | Harmon | A01B 79/005 |
| 2020/0305335 A1* | 10/2020 | Schoeny | A01C 5/068 |
| 2020/0337200 A1* | 10/2020 | Smith | A01B 23/06 |
| 2020/0355667 A1* | 11/2020 | Schoeny | A01B 79/005 |
| 2020/0404829 A1* | 12/2020 | Knobloch | A01B 19/10 |
| 2020/0404830 A1* | 12/2020 | Ferrari | A01B 63/1112 |
| 2020/0404833 A1* | 12/2020 | Stanhope | A01B 63/24 |
| 2021/0022284 A1* | 1/2021 | Glovier | A01B 71/08 |
| 2021/0029865 A1* | 2/2021 | Smith | A01B 76/00 |
| 2021/0045274 A1* | 2/2021 | Cozza | A01B 49/027 |
| 2021/0045281 A1* | 2/2021 | Glovier | G01N 27/228 |

* cited by examiner

SYSTEM AND METHOD FOR DE-PLUGGING ROTATING GROUND ENGAGING TOOLS OF AN AGRICULTURAL IMPLEMENT

FIELD OF THE INVENTION

The present disclosure generally relates to agricultural implements and, more particularly, to systems and methods for de-plugging rotating ground engaging tools of an agricultural implement by rotationally driving such tools when material accumulation is detected.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include one or more ground engaging components configured to rotate relative to the soil as the implement is moved across the field. For example, in certain configurations, the implement may include one or more harrow disks, leveling disks, rolling baskets, and/or the like. Such rotating ground engaging component(s) loosen and/or otherwise agitate the soil to prepare the field for subsequent planting operations.

During tillage operations, field materials, such as residue, soil, rocks, and/or the like, may become trapped or otherwise accumulate between adjacent rotating ground engaging tools of the implement. Such accumulation of field materials may inhibit the operation of the rotating ground engaging tools in a manner that prevents the tools from providing adequate tillage to the field. For instance, material accumulation between adjacent disk blades can result in a plugged condition in which the rotation of the disk blades relative to the ground is slowed or even stopped, thereby hindering the performance of such tools. In such instances, it is typically necessary for the operator to take a corrective action to remove the plugged or accumulated field materials from between the adjacent tools. However, typical de-plugging methods require that the tools be raised out of the ground. For instance, US 2018/0352718, entitled "System and Method for Reducing Soil and Crop Residue Accumulation Relative to Ground Engaging Tools of a Tillage Implement" and filed Jun. 8, 2017, discloses a de-plugging method in which the ground engaging tools are temporarily raised out of the ground and subsequently actuated (e.g., via vibration/rotation) to remove accumulated materials prior to lowering the tools back into the ground. While this de-plugging method provides an effective solution, it is typically only performed at the headlands due to the requirement that the tools be raised out of the ground.

Accordingly, an improved system and method for de-plugging rotating ground engaging tools of an agricultural implement that allows for such de-plugging to occur while the tools are at their lowered or working position would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for de-plugging rotating ground engaging tools of an agricultural implement. The system includes first and second ground engaging tools configured to be supported relative to a frame of an agricultural implement, with the first and second ground engaging tools being spaced apart from each other such that a flow gap is defined between the tools. The system also includes a rotational actuator configured to rotationally drive the first and second ground engaging tools about a rotational axis, a sensor configured to capture data indicative of material accumulation within the flow gap defined between the first and second ground engaging tools, and a controller communicatively coupled to the rotational actuator and the sensor. The controller is configured to determine when the first and second ground engaging tools are experiencing a plugged condition based on the data received from the sensor. Additionally, in response to the determination that the first and second ground engaging tools are experiencing the plugged condition, the controller is further configured to control an operation of the rotational actuator such that the tools are rotationally driven about the rotational axis while such tools are disposed at a working position relative to a soil surface of a field.

In another aspect, the present subject matter is directed to an agricultural implement. The implement includes a frame and a disk gang including a plurality of disk blades supported relative to the frame, with the disk blades being ganged together via a common shaft for rotation about a rotational axis. The implement also includes a rotational actuator coupled to the common shaft such that the rotational actuator is configured to rotationally drive the disk blades about the rotational axis, a sensor configured to capture data indicative of material accumulation within a flow gap defined between adjacent disk blades of the plurality of disk blades, and a controller communicatively coupled to the rotational actuator and the sensor. The controller is configured to determine when the disk gang is experiencing a plugged condition based on the data received from the sensor. Additionally, in response to the determination that the disk gang is experiencing the plugged condition, the controller is further configured to control an operation of the rotational actuator such that the disk blades are rotationally driven about the rotational axis while the disk blades are disposed at a working position relative to a soil surface of a field.

In a further aspect, the present subject matter is directed to a method for de-plugging rotating ground engaging tools of an agricultural implement, with the agricultural implement including a frame and first and second ground engaging tools configured to be supported relative to the frame such that a flow gap is defined between the tools. The method includes receiving, with a computing device, data indicative of material accumulation within the flow gap defined between the first and second ground engaging tools and determining, with the computing device, when the first and second ground engaging tools are experiencing a plugged condition based on the received data. Moreover, in response to the determination that the first and second ground engaging tools are experiencing the plugged condition, the method includes controlling, with the computing device, an operation of a rotational actuator coupled to the first and second ground engaging tools such that the first and second ground engaging tools are rotationally driven while the first and second ground engaging tools are disposed at a working position relative to a soil surface of a field.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for de-plugging rotating ground engaging tools of an agricultural implement. Specifically, in several embodiments, a rotational actuator, such as a hydraulic or electric motor, may be coupled to one or more ground engaging tools of an agricultural implement to allow the tools to be rotationally driven about their rotational axis while such tools are maintained at their lowered or working position (i.e., while the tools are penetrating or otherwise engaging the ground). In such embodiments, a controller of the disclosed system may be configured to receive data from one or more sensors associated with material accumulation relative to the ground engaging tool(s), such as material accumulation between adjacent ground engaging tools. When a plugged condition is detected by the controller based on the sensor data, the controller may be configured to control the operation of the rotational actuator to rotationally drive the ground engaging tool(s). Such rotation of the ground engaging tool(s) may provide an additional de-plugging force that serves to push or fling out the accumulated field materials as the implement continues to be moved across the field during the performance of an agricultural operation, thereby allowing the tool(s) to be de-plugged without raising the tool(s) out of the ground or stopping the motion of the implement.

Figure 1:
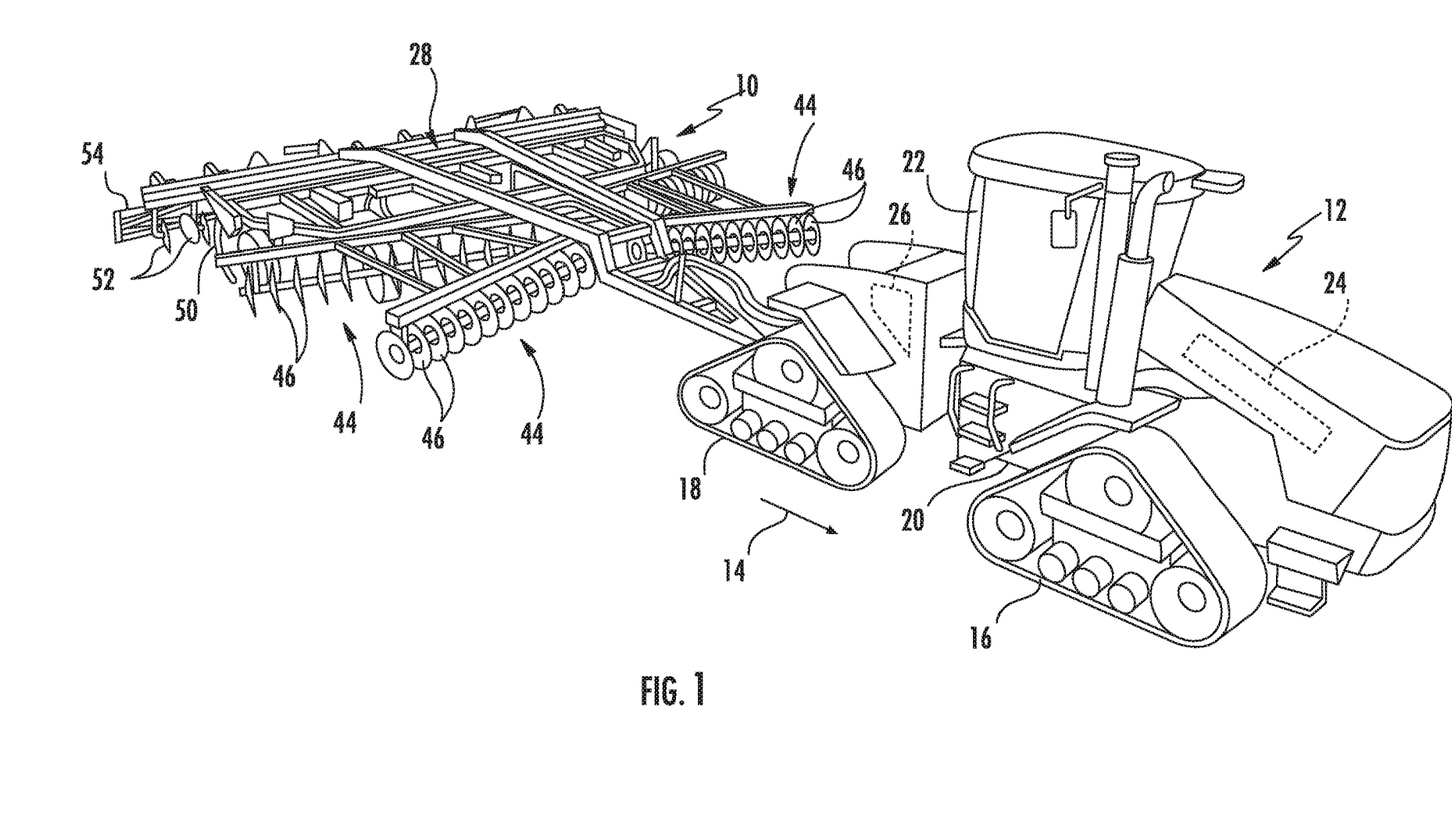
FIG. 1 illustrates a perspective view of one embodiment of an agricultural implement coupled to a work vehicle in accordance with aspects of the present subject matter.
Figure 2:
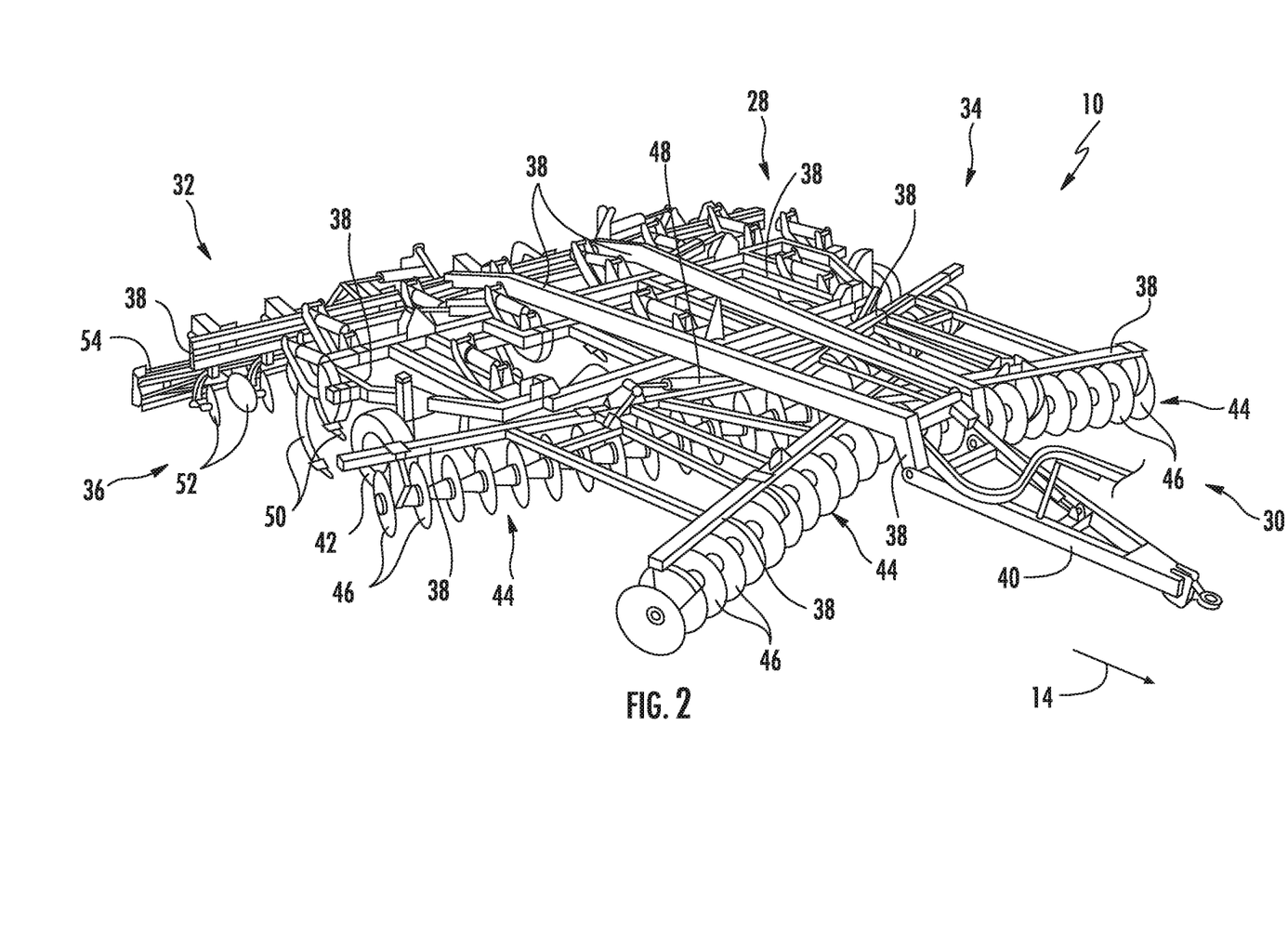
FIG. 2 illustrates another perspective view of the agricultural implement shown in FIG. 1 in accordance with aspects of the present subject matter.

Referring now to the drawings, FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices for permitting an operator to control the operation of one or more components of the work vehicle 12 and/or one or more components of the implement 10. Additionally, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIGS. 1 and 2, the implement 10 may include a frame 28. More specifically, the frame 28 may extend longitudinally between a forward end 30 and an aft end 32. The frame 28 may also extend laterally between a first side 34 and a second side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one is shown) may be coupled to the frame 28 to facilitate towing the implement 10 in the direction of travel 14.

In several embodiments, the frame 28 may be configured to support one or more gangs or sets 44 of disk blades 46. Each disk blades 46 may, in turn, be configured to penetrate into or otherwise engage the soil as the implement 10 is being pulled through the field. In this regard, the various disk gangs 44 may be oriented at an angle relative to the direction of travel 14 to promote more effective tilling of the soil. In the embodiment shown in FIGS. 1 and 2, the implement 10 includes four disk gangs 44 supported on the frame 28 adjacent to its forward end 30. However, it should be appreciated that, in alternative embodiments, the implement 10 may include any other suitable number of disk gangs 44, such as more or fewer than four disk gangs 44. Furthermore, in one embodiment, the disk gangs 44 may be mounted to the frame 28 at any other suitable location, such as adjacent to its aft end 32.

Moreover, in several embodiments, the implement 10 may include a plurality of disk gang actuators 48 (one is shown), with each actuator 48 being configured to move or otherwise adjust the orientation or position of one of the disk gangs 44 relative to the implement frame 28. For example, a first end of each actuator 48 may be coupled to the frame member 38 on which the corresponding disk gang 44 is supported, while a second end of each actuator 48 may be coupled to a separate portion of the frame 28. The rod of each actuator 48 may be configured to extend and/or retract relative to the corresponding cylinder to adjust the angle of the corresponding disk gang 44 relative to a lateral centerline (not shown) of the frame 28 and/or the penetration depth of the associated disk blades 46. In the illustrated embodiment, each actuator 48 corresponds to a fluid-driven actuator, such as a hydraulic or pneumatic cylinder. However, it should be appreciated that each actuator 104 may correspond to any other suitable type of actuator, such as an electric linear actuator.

Additionally, as shown, in one embodiment, the implement frame 28 may be configured to support other ground engaging tools. For instance, in the illustrated embodiment, the frame 28 is configured to support a plurality of shanks 50 configured to rip or otherwise till the soil as the implement 10 is towed across the field. Furthermore, in the illustrated embodiment, the frame 28 is also configured to support a plurality of leveling blades 52 and rolling (or crumbler) basket assemblies 54. However, in other embodiments, any other suitable ground-engaging tools may be coupled to and supported by the implement frame 28, such as a plurality closing disks.

It should be appreciated that the configuration of the implement 10 and the work vehicle 12 described above and shown in FIGS. 1 and 2 is provided only to place the present subject matter in an exemplary field of use. Thus, it should be appreciated that the present subject matter may be readily adaptable to any manner of implement and/or work vehicle configuration.

Figure 3:
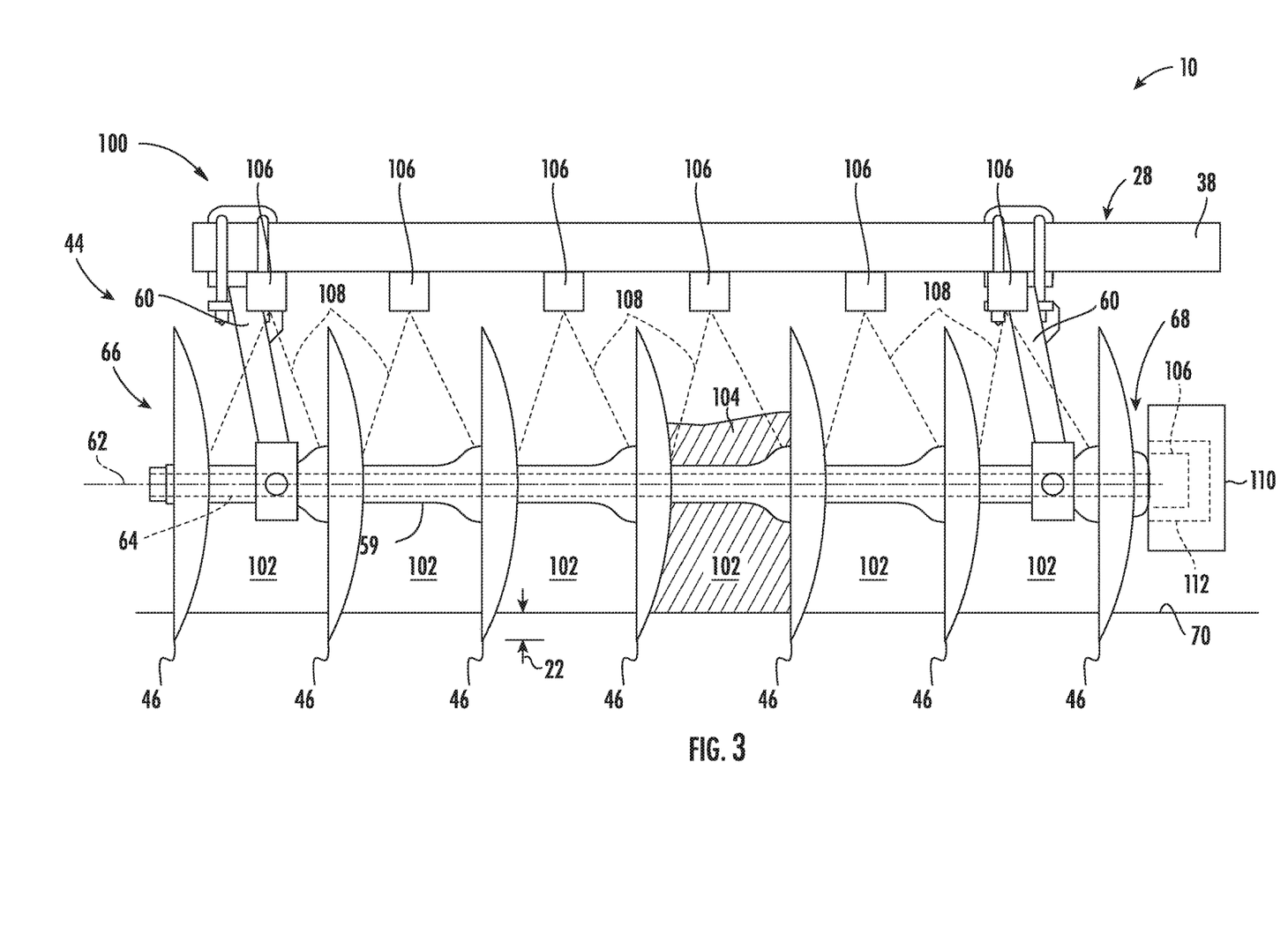
FIG. 3 illustrates a view of one embodiment of a system for de-plugging rotating ground engaging tools of an agricultural implement in accordance with aspects of the present subject matter, particularly illustrating various system components installed relative to a disk gang of an agricultural implement for detecting plugging of the disk gang.

Referring now to FIG. 3, a simplified view of one embodiment of a system 100 for de-plugging rotating ground engaging tools of an agricultural implement is illustrated in accordance with aspects of the present subject matter. For purposes of discussion, the system 100 will generally be described herein with reference to one of the disk gangs 44 of the implement 10 described above with reference to FIGS. 1 and 2. However, in other embodiments, the system 100 may be utilized for de-plugging any other suitable rotating ground engaging tools having any other suitable tool configuration.

As shown in FIG. 3, the disk gang 44 may be configured to be supported relative to a toolbar or frame member 38 of the implement frame 28 via one or more hangers 60 for rotation relative to the ground about a rotational axis 62. Additionally, the disk gang 44 includes a disk gang shaft 64 (also referred to herein as a common shaft) extending axially along the rotational axis 62 between a first shaft end 60 and a second shaft end 62. As shown, the disk blades 46 of the disk gang 44 are rotatably coupled to the disk gang shaft 64 for rotation with the shaft 64 about the rotational axis 62. Thus, as the implement 10 is moved across a field with the disk gang 44 positioned at its lowered or working position, the disk blades 46 may be configured to penetrate the soil surface (e.g., indicated by line 70 in FIG. 3) of the field and rotate about the rotational axis 62 relative to the soil within the field. For instance, as shown in FIG. 3, when at the working position, the disk blades 46 may penetrate the soil surface 70 to a given penetration depth 72.

Moreover, as shown in FIG. 2, the disk blades 46 are spaced apart from each other axially along the rotational axis 62 such that a material flow zone or gap 102 is defined between each adjacent pair of disk blades 46. In general, each flow gap 102 corresponds to the area or volume through which field materials flow during the operation of the implement 10. Thus, as the implement 10 is moved across the field, field materials (e.g., soil, residue, rocks, and/or the like) may flow through the flow gaps 102 as such field materials are being tilled or otherwise processed by the disk blades 46. In this regard, during normal, non-plugged operation of the disk gang 44, substantially all of the field materials being processed by the disk gang 44 will flow through the flow gaps 102 without accumulating between the adjacent disk blades 46. However, in certain instances, field materials may accumulate within the flow zone(s) 102, thereby leading to a plug condition. For example, when the soil in the field has high moisture content, the soil may stick or adhere to the disk blades 46 such that the soil accumulates with the associated flow zone(s) 102. Moreover, a large chunk of residue or a rock may become lodged between a pair of adjacent disk blades 46 in a manner that inhibits the flow of field materials through the associated flow zone(s) 102, thereby causing additional field materials to accumulate therein. For instance, as shown in FIG. 3, a significant amount of field materials (e.g., as indicated by cross-hatched region 104 in FIG. 3) have accumulated within one of the flow zones 102 such that the disk gang 44 is experiencing a plugged condition.

In several embodiments, the system 100 may include one or more accumulation sensors 106 configured to detect a parameter (or otherwise provide data) associated with or indicative of material accumulation occurring relative to the disk blades 46. For instance, in one embodiment, the accumulation sensor(s) 106 may be configured to directly detect the presence of material accumulation within one or more of the flow zone or gaps 102 defined between the adjacent disk blades 46. Specifically, as shown in FIG. 3, each accumulation sensor 106 is installed or otherwise positioned on a portion of the implement frame 28 (e.g., on an adjacent frame member 38) such that the accumulation sensor 106 had a field of view 108 directed towards one of the flow zones 102, thereby allowing the accumulation sensor 106 to detect material accumulation between the adjacent blades 46.

In one embodiment, each accumulation sensor 106 may correspond to a vision-based sensor. In such an embodiment, each accumulation sensor 106 may be configured to capture vision data (e.g., images, point cloud data, and/or the like) indicative of field materials present within and/or passing through the associated flow zone(s) 102. It should be appreciated that, when vision-based sensing is utilized, the accumulation sensor(s) 106 may generally correspond to any suitable sensing device(s) configured to capture vision data. As such, in several embodiments, each accumulation sensor 106 may correspond to a suitable camera(s) configured to capture three-dimensional images of the field materials within the associated field of view 108. For instance, in a particular embodiment, each accumulation sensor 106 may correspond to a stereographic camera(s) having two or more lenses, with a separate image sensor for each lens to allow the camera(s) to capture stereographic or three-dimensional images. However, in alternative embodiments, each accumulation sensor 106 may, for example, correspond to a Light Detection and Ranging (LIDAR) sensor(s) configured to capture point cloud data of the field materials within the associated field of view 108.

In another embodiment, each accumulation sensor 106 may be configured as a beam-based sensor(s). As such, each accumulation sensor 106 may be configured to emit one or more output signals across its field of view 108 for reflection off of the field materials located within the associated flow zone(s) 102. The output signals may, in turn, be reflected by the field materials as return signals for receipt by the accumulation sensor 106. In such an embodiment, the time-of-flight (TOF) of the output/return signals may, for example, be utilized to determine the presence of material accumulation within the associated flow zone(s) 102. It should be appreciated that, when beam-based sensing is utilizes, the accumulation sensor(s) 106 may generally correspond to any suitable sensing device(s). For example, each accumulation sensor 106 may correspond to an ultrasonic sensor(s) or a radio detection and ranging sensor (RADAR) sensor(s).

It should be appreciated that, although the illustrated embodiment includes one accumulation sensor 106 associated with each flow gap 102, the system 100 may include any other suitable number of accumulation sensors 106, such as more or less than six sensors 106. Furthermore, in alternative embodiments, each accumulation sensor 106 may be configured to detect field materials within two or more flow gaps 102. Additionally, in a further embodiment, a plurality of accumulation sensors 106 may be configured to detect field materials within each flow gap 102. For example, in such an embodiment, a first accumulation sensor 106 may be configured to detect field materials within a first half of the flow gap 102, while a second accumulation sensor 106 may be configured to detect field materials within a second half of the flow gap 102.

Additionally, it should be appreciated, that as an alternative to directly sensing the field materials within a given flow gap(s) 102, the accumulation sensor(s) 106 may, instead, be configured to indirectly detect the presence of field materials, such as by detecting a parameter that varies with the accumulation of field materials between the disk blades 46. For instance, in one embodiment, the accumulation sensors) 106 may correspond to a rotational speed sensor configured to monitor the rotational speed of the disk blades 46. Specifically, as shown in FIG. 3, a rotational speed sensor 106 may be coupled to the disk gang shaft 64 (e.g., at its second axial end 68) to monitor the rotational speed of the shaft 64 and, thus, the rotational speed of the disk blades 46. As is generally understood, as field materials accumulate between the disk blades 46 and plug the associated flow gap(s) 102, the rotational speed of the disks 46 may be slowed (and even eventually stopped). Thus, by detecting the rotational speed of the disk blades 46, material accumulation between the blades 46 may be inferred when the rotational speed drops a given amount below a predetermined tool speed at which such disk blades 46 would otherwise be expected to rotate given the current ground speed of the implement 10.

Additionally, as shown in FIG. 3, the system 100 may also include a rotational actuator 110 (e.g., a hydraulic motor or electric motor) configured to rotationally drive the disk blades 46 about their rotational axis 62. Specifically, in the illustrated embodiment, the rotational actuator 110 is coupled to the disk gang shaft 64 at one of its ends (e.g., the second lateral end 68) such that the rotational actuator 110 is configured to rotationally drive the disk blades 46 by driving the common shaft 64 coupled to the blades 46. Moreover, as shown in FIG. 3, a clutch 112 (e.g., an electronically controllable clutch) may be provided in operative association with the rotational actuator 110 to allow the actuator 110 to be selectively engaged with and disengaged from the disk gang shaft 64. For instance, it may be desirable for the rotational actuator 110 to be disengaged from the shaft 64 during normal, non-plugged operation of the disk gang 44. However, when it is determined that the disk gang 44 is experiencing a plugged condition (e.g., based on the data provided by the accumulation sensor(s) 106), the clutch 112 may be controlled such that the rotational actuator 110 is engaged with the shaft 64, thereby allowing the actuator 110 to rotationally drive the disk blades 46 to facilitated de-plugging of the accumulated field materials. It should be appreciated that, in one embodiment, the clutch 112 may be configured as any suitable component or mechanism that allows the rotational actuator 110 to free-wheel on its own when in the disengaged state.

Figure 4:
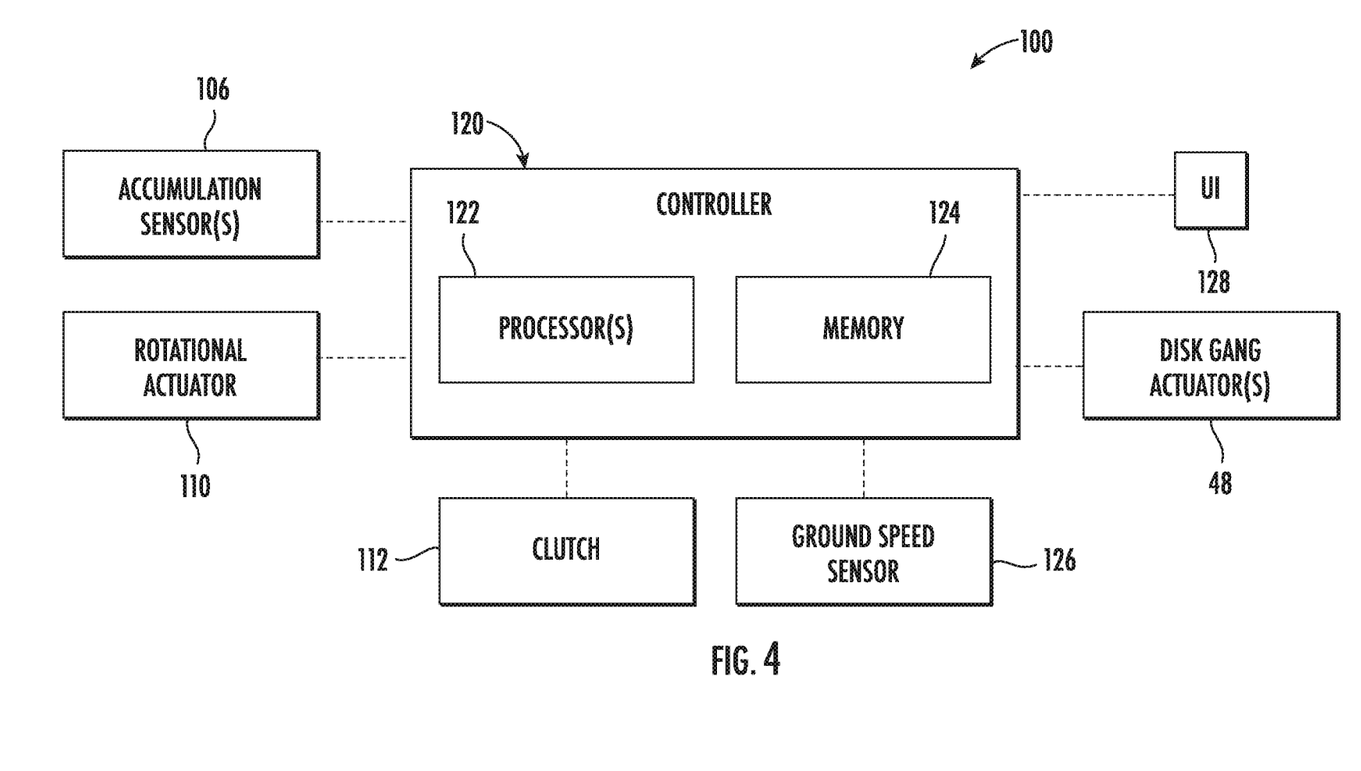
FIG. 4 illustrates a schematic view of one embodiment of a system for de-plugging rotating ground engaging tools of an agricultural implement in accordance with aspects of the present subject matter.

Referring now to FIG. 4, a schematic view one embodiment of a system 100 for de-plugging rotating ground engaging tools of an agricultural implement is illustrated in accordance with aspects of the present subject matter. In general, the system 100 will be described herein with reference to the implement 10 described above with reference to FIGS. 1 and 2, as well as the disk gang 44 and various system components shown in FIG. 3. However, it should be appreciated by those of ordinary skill in the art that the disclosed system 100 may generally be utilized with agricultural implements having any other suitable implement configuration and/or with rotating ground engaging tools having any other suitable tool configuration.

As shown in FIG. 4, the system 100 may include a controller 120 configured to electronically control the operation of one or more components of the implement 10 and/or the system 100, such as the rotational actuator 110 and associated clutch 112. In general, the controller 120 may comprise any suitable processor-based device known in the art, such as a computing device or any suitable combination of computing devices. Thus, in several embodiments, the controller 120 may include one or more processor(s) 122 and associated memory device(s) 124 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 124 of the controller 120 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 124 may generally be configured to store suitable computer-readable instructions that, when implemented by the processor(s) 122, configure the controller 120 to perform various computer-implemented functions, such as one or more aspects of the method 200 described below with reference to FIG. 5. In addition, the controller 120 may also include various other suitable components, such as a communications circuit or module, one or more input/output channels, a data/control bus and/or the like.

It should be appreciated that the controller 120 may correspond to an existing controller of the implement 10 or the work vehicle 12 or the controller 120 may correspond to a separate processing device. For instance, in one embodiment, the controller 120 may form all or part of a separate plug-in module that may be installed within the implement 10 or the work vehicle 12 to allow for the disclosed system and method to be implemented without requiring additional software to be uploaded onto existing control devices of the implement 10 or the work vehicle 12.

As shown in FIG. 4, the controller 120 may be communicatively coupled to the accumulation sensor(s) 106 to allow the controller 120 to receive data from the sensor(s) 106 associated with or indicative of the accumulation of field materials relative to the disk blades 46. As such, the controller 120 may be configured to monitor the presence and/or amount of material accumulation within the flow gaps 102 (FIG. 3) and/or a parameter indicative of such material accumulation to determine when the associated disk gang 44 is experiencing a plugged condition. For instance, when the accumulation sensor(s) 106 is configured to directly detect the presence of material accumulation within the flow gap(s) 102 defined between adjacent disc blades 46, the controller 120 may be configured to compare the amount of material accumulation detected to one or more material accumulation thresholds set for the disk gang 44 and/or associated flow gap(s) 102. In such an embodiment, the threshold(s) may, for example, be associated with a given degree or magnitude of material accumulation between the disk blades 46. Thus, when the amount of material accumulation detected reaches or passes the specific amount(s) associated with the accumulation threshold(s), the controller 102 may determine or infer that the disk gang 44 is experiencing a plugged condition. Alternatively, when the accumulation sensor(s) 106 is configured to indirectly detect the presence of material accumulation within the flow gap(s) 102 by detecting an associated parameter, the controller 120 may be configured to compare the detected parameter to one or more associated thresholds set for such parameter. For instance, when the accumulation sensor(s) 106 is configured to detect the rotational speed of the disk blades 46, the controller 120 may compare the detected speed to one or more associated rotational speed thresholds. In such an embodiment, when the detected speed of the disk blades 46 drops below the associated speed threshold(s), the controller 120 may determine or infer that the disk gang 44 is experiencing a plugged condition.

When it is determined that the disk gang 44 is experiencing a plugged condition (e.g., based on the sensor data), the controller 120 may be configured to execute a control or corrective action(s) designed to reduce the amount of material accumulation between the plugged disk blades 46. Specifically, in accordance with aspects of the present subject matter, the controller 120 may be configured to rotationally drive the disk blades 46 while such blades 46 are at their ground-engaging or working positions (i.e., while the blades 46 are penetrating the soil surface) to facilitate de-plugging of the disk blades 46 during the performance of the associated agricultural operation. For example, when plugging is detected as the implement 10 is being traversed across the field to perform an agricultural operation (e.g., a tillage operation), the controller 120 may be configured to control the operation of the clutch 112 to rotationally engage or couple the rotational actuator 110 with the disk blades 46 (e.g., via the common gang shaft 64). Thereafter, the controller 120 may control the operation of the rotational actuator 110 such that the disk blades 46 are rotationally driven at a given rotational speed. Such rotation of the disk blades 46 may provide an additional de-plugging force that serves to push or fling out the accumulated field materials as the implement 10 continues to be moved across the field during the performance of the agricultural operation, thereby allowing the disk gang 44 to be de-plugged without raising the disk blades 46 out of the ground or stopping the motion of the implement 10.

In several embodiments, the controller 120 may be configured to control the operation of the rotational actuator 110 such that the disk blades 46 are rotationally driven at a rotational speed selected as a function of the current ground speed of the implement 10. Specifically, in one embodiment, the controller 120 may transmit suitable control signals to the rotational actuator 110 to cause the disk blades 46 to be driven at a rotational speed that is equal to or greater than a predetermined non-plugged tool speed at which it is expected that the disk blades 46 will rotate due to engagement with the field (i.e., without being driven by the actuator 110) while the agricultural implement 10 is traveling at the current ground speed. For instance, at each ground speed of the implement 10, it is typically expected that the disk blades 46 will rotate at a given rotational speed (e.g., in RPMs) due solely to engagement with the soil when the disk gang 44 is not plugged and the rotational actuator 110 is disengaged from the disk blades 46, with such rotational speed of the blades 46 generally increasing with increases in the implement ground speed and vice versa.

In several embodiments, these predetermined tool speeds may form the basis for selecting the rotational speed at which the disk blades 46 should be rotated given the current ground speed of the implement 10. For instance, as shown in FIG. 4, the controller 126 may be communicatively coupled to a ground speed sensor 126 (e.g., a GPS device or any other suitable sensing device configured to provide an indication of the ground speed of the implement 10) for monitoring the current ground speed of the implement 10. By monitoring the current ground speed, the controller 120 may determine the speed at which the disk blades should be rotating, assuming a non-plugged condition. Thereafter, in response to the determination of a plugged condition, the controller 120 may select a rotational speed for rotationally driving the disk blades 46 based on the expected rotational speed for the disk blades 46. For instance, in one embodiment, the controller 120 may control the operation of the rotational actuator 110 such that the disk blades 46 are rotationally driven at a speed that is equal to their expected rotational speed given the current speed of the implement 10. In another embodiment, the controller 120 may control the operation of the rotational actuator 110 such that the disk blades 46 are rotationally driven at a rotational speed that is greater than their expected rotational speed given the current speed of the implement 10 by a predetermined speed margin (e.g., +5% or +10% of the expected rotational speed).

Additionally, when attempting to de-plug the disk gang 44, the controller 120 may be configured to control the operation of the rotational actuator 110 such that the disk blades 46 are rotationally driven at the selected rotational speed for a predetermined time period. For instance, in one embodiment, the rotational actuator 110 may be controlled so as to rotationally drive the disk blades 46 for an initial predetermined time period (e.g., 2-5 seconds). Following activation of the rotational actuator 110 for the predetermined time period, the controller 120 may be configured to assess whether such rotation of the disk blades 46 resulted in de-plugging of the disk gang 44 (e.g., based on updated sensor data received from the accumulation sensor(s) 106).

If it is determined that the control action was not effective in de-plugging the disk gang 44, the controller 120 may, for instance, notify the operator that the disk gang 44 is still plugged despite rotationally driving the disk blades 46. Alternatively, the controller 120 may be configured to subsequently control the operation of the rotational actuator 110 such that the disk blades 46 are rotationally driven across a second predetermined time period (e.g., 2-5 seconds) in an attempt to again de-plug the disk gang 44. In such instance, the rotational speed at which the disk blades 46 are being driven may, for instance, be increased for the second time period (e.g., over the rotational speed used during the initial time period) to increase the likelihood of de-plugging the disk gang 44.

It should be appreciated that, as an alternative to rotationally driving the disk blades 46 for a predetermined time period(s), the controller 120 may, instead, be configured to control the operation of the rotational actuator 110 such that the disk blades are continuously driven until it is detected that the disk gang 44 has been de-plugged. In such an embodiment, the disk blades 46 may be rotationally driven at a constant rotational speed or a varying rotational speed. For example, the rotational actuator 110 may be controlled such that the disk blades 46 are rotationally driven at an initial or base speed upon initial detection of the plugged condition. Thereafter, assuming the data provided by the accumulation sensor(s) 106 continues to indicate a plugged condition, the rotational speed may be ramped up over time (e.g., at a predetermined ramp rate) until it has been detected that the disk gang 44 has been de-plugged.

Referring still to FIG. 4, the system 100 may also include a user interface 128. In general, the user interface 128 may be configured to provide feedback (e.g., notifications associated with tool plugging) to the operator of the implement 10. As such, the user interface 128 may include one or more feedback devices (not shown), such as display screens, speakers, warning lights, and/or the like, which are configured to communicate such feedback. In addition, some embodiments of the user interface 128 may include one or more input devices (not shown), such as touchscreens, keypads, touchpads, knobs, buttons, sliders, switches, mice, microphones, and/or the like, which are configured to receive user inputs from the operator. Such input devices may be used, for example, by the operator to manually instruct the controller 120 to control the operation of the rotational actuator 110 to rotationally drive the disk blades 46. In one embodiment, the user interface 128 may be positioned within the cab 22 of the work vehicle 12. However, in alternative embodiments, the user interface 128 may have any suitable configuration and/or be positioned in any other suitable location.

In one embodiment, the controller 120 may be configured to instruct the user interface 128 to provide a notification to the operator (e.g., by causing a visual or audible notification or indicator to be presented to the operator) that provides an indication that field materials have accumulated between adjacent disk blades 46 and/or that provides an indication of the effectiveness (or lack thereof) of attempts to de-plug the disk gang 44 (e.g., by rotationally driving the disk blades). In response to such notifications, the operator may, if desired, choose to initiate any suitable corrective action he/she believes is necessary to address any remaining plugging issues.

It should also be appreciated that, in addition to rotationally driving the disk blades 46 and/or transmitting notifications to the operator (or as an alternative thereto), the controller 120 may be configured to automatically execute any other suitable control or corrective actions, such as by automatically adjusting one or more operating parameters of the implement 10. For instance, as shown in FIG. 4, the controller 120 may be communicatively coupled to the disk gang actuator(s) 48 of the implement 10 to allow control signals to be transmitted from the controller 120 instructing the actuator(s) 48 to adjust the angle of the disk gang(s) 44 relative to the lateral centerline of the implement frame 28 and/or the penetration depth of the associated disk blade(s) 46. In addition, the controller 120 may be configured to automatically adjust the ground speed at which the work vehicle 12 is towing the implement 10 across the field.

Figure 5:
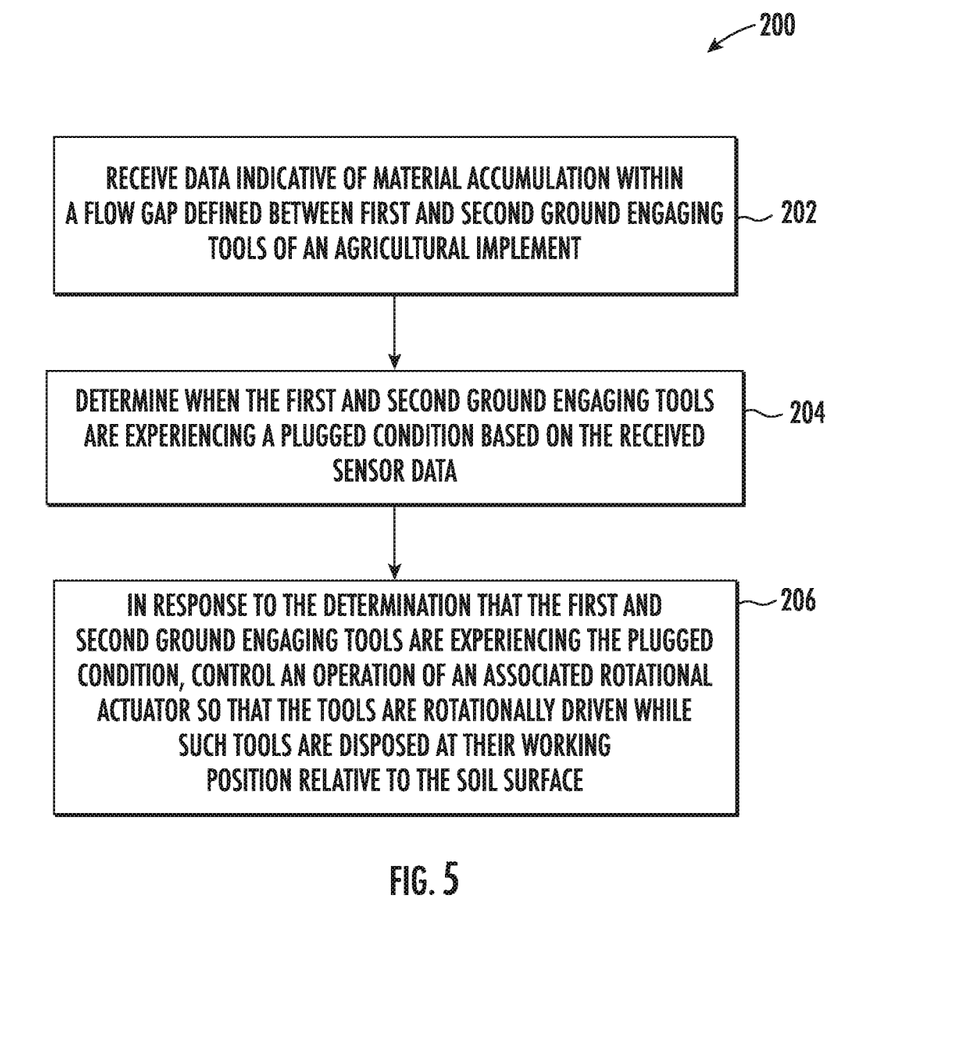
FIG. 5 illustrates a flow diagram of one embodiment of a method for de-plugging rotating ground engaging tools of an agricultural implement in accordance with aspects of the present subject matter.

Referring now to FIG. 5, a flow diagram of one embodiment of a method 200 for de-plugging rotating ground engaging tools of an agricultural implement is illustrated in accordance with aspects of the present subject matter. In general, the method 200 will be described herein with reference to the agricultural implement 10, the disk gang 44, and the system 100 described above with reference to FIGS. 1-4. However, it should be appreciated by those of ordinary skill in the art that the disclosed method 200 may generally be executed with any agricultural implement having any suitable implement configuration, any set of rotating ground engaging tools having any suitable tool configuration, and/or any system having any suitable system configuration. In addition, although FIG. 5 depicts steps performed in a particular order for purposes of illustration and discussion, the methods discussed herein are not limited to any particular order or arrangement. One skilled in the art, using the disclosures provided, herein, will appreciate that various steps of the methods disclosed herein can be omitted, rearranged, combined, and/or adapted in various ways without deviating from the scope of the present disclosure.

As shown in FIG. 5, at (202), the method 200 may include receiving data indicative of material accumulation within a flow gap defined between first and second ground engaging tools of an agricultural implement. For instance, as described above, the controller 120 may be communicatively coupled to one or more accumulation sensors 106 configured to provide data associated with or indicative of material accumulation between adjacent ground engaging tools, such as within the flow gaps 102 defined between adjacent blade disks 46 of the disk gang 44 shown in FIG. 3.

Additionally, at (204), the method 200 may include determining when the first and second ground engaging tools are experiencing a plugged condition based on the received sensor data. For instance, as described above, the controller 120 may be configured to analyze the data received from the accumulation sensor(s) 106 to determine or estimate when the disk gang 44 is experiencing a plugged condition. Specifically, in one embodiment, the controller 120 may be configured to compare the amount of material accumulation detected within a flow gap 102 defined between adjacent disk blades 46 to a predetermined accumulation threshold(s) to estimate or infer when the associated disk gang 44 is plugged. In another embodiment, the controller 120 may be configured to compare the rotational speed of the disk blades 46 to a predetermined speed threshold(s) to estimate or infer when the associated disk gang 44 is plugged.

Moreover, as shown in FIG. 5, at (206), in response to the determination that the first and second ground engaging tools are experiencing the plugged condition, the method 200 may include controlling an operation of a rotational actuator coupled to the first and second ground engaging tools so that the tools are rotationally driven while such tools are disposed at their working position relative to the soil surface. Specifically, as described above, the controller 120 may be configured to control the operation of the rotational actuator 110 to rotationally drive the disk blades 46 relative to the soil while the blades 46 are maintained at their lowered or working position (i.e., while the blades 46 are penetrating the soil surface). In doing so, the specific rotational speed at which the blades 46 are rotated may, in one embodiment, be selected based on the current ground speed of the associated implement 10.

It is to be understood that the steps of the method 200 are performed by the controller 120 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 120 described herein, such as the method 200, is implemented in software code or instructions which are tangibly stored on a tangible computer readable medium. The controller 120 loads the software code or instructions via a direct interface with the computer readable medium or via a wired and/or wireless network. Upon loading and executing such software code or instructions by the controller 120, the controller 120 may perform any of the functionality of the controller 120 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for de-plugging rotating ground engaging tools of an agricultural implement, the system comprising:
   first and second ground engaging tools configured to be supported relative to a frame of an agricultural implement, the first and second ground engaging tools being spaced apart from each other such that a flow gap is defined between the first and second ground engaging tools;
   a rotational actuator configured to rotationally drive the first and second ground engaging tools about a rotational axis;
   a sensor configured to capture data indicative of material accumulation within the flow gap defined between the first and second ground engaging tools; and
   a controller communicatively coupled to the rotational actuator and the sensor, the controller configured to:
      determine when the first and second ground engaging tools are experiencing a plugged condition based on the data received from the sensor;
      monitor a current ground speed of the agricultural implement as the agricultural implement is being moved across the field during the performance of an agricultural operation; and
      control an operation of the rotational actuator such that the first and second ground engaging tools are rotationally driven about the rotational axis in response to the determination that the first and second ground engaging tools are experiencing the plugged condition, the controller being configured to control the operation of the rotational actuator such that the first and second ground engaging tools are rotationally driven at a rotational speed selected as a function of the current ground speed of the agricultural implement,
   wherein the first and second ground engaging tools are rotationally driven by the rotational actuator while the first and second ground engaging tools are disposed at a working position relative to a soil surface of a field.

2. The system of claim 1, wherein the first and second ground engaging tools comprise disk blades, the disk blades being ganged together via a common shaft extending axially along the rotational axis.

3. The system of claim 2, wherein the rotational actuator is rotatably coupled to the common shaft such that the rotational actuator is configured to rotationally drive the first and second ground engaging tools by rotating the common shaft.

4. The system of claim 1, wherein the rotational speed is selected based on a predetermined non-plugged tool speed at which it is expected that the first and second ground engaging tools will rotate due to engagement with the field while the agricultural implement is being moved across the field at the current ground speed.

5. The system of claim 1, wherein the controller is configured to control the operation of the rotational actuator such that the first and second ground engaging tools are rotationally driven for a predetermined time period in response to the determination that the first and second ground engaging tools are experiencing the plugged condition.

6. The system of claim 1, wherein the controller is configured to control the operation of the rotational actuator such that the first and second ground engaging tools are rotationally driven at a rotational speed that is varied over time.

7. The system of claim 1, wherein the rotational actuator comprises one of a hydraulic motor or an electric motor.

8. The system of claim 1, further comprising a clutch configured to selectively engage and disengage the rotational actuator relative to the first and second ground engaging tools, the controller being configured to control an operation of the clutch to engage the rotational actuator with the first and second ground engaging tools in response to the determination that the first and second ground engaging tools are experiencing the plugged condition.

9. An agricultural implement, comprising:
   a frame;

a disk gang including a plurality of disk blades supported relative to the frame, the plurality of disk blades being ganged together via a common shaft for rotation about a rotational axis;

a rotational actuator coupled to the common shaft such that the rotational actuator is configured to rotationally drive the plurality of disk blades about the rotational axis;

a sensor configured to capture data indicative of material accumulation within a flow gap defined between adjacent disk blades of the plurality of disk blades; and a controller communicatively coupled to the rotational actuator and the sensor, the controller configured to:
determine when the disk gang is experiencing a plugged condition based on the data received from the sensor;

monitor a current ground speed of the agricultural implement as the agricultural implement is being moved across the field during the performance of an agricultural operation;

control an operation of the rotational actuator such that the plurality of disk blades are rotationally driven about the rotational axis in response to the determination that the disk gang is experiencing the plugged condition, the controller being configured to control the operation of the rotational actuator such that the plurality of disk blades are rotationally driven at a rotational speed selected as a function of the current ground speed of the agricultural implement, wherein the plurality of disk blades are rotationally driven by the rotational actuator while the plurality of disk blades are disposed at a working position relative to a soil surface of a field.

10. The agricultural implement of claim 9, wherein the rotational speed is selected based on a predetermined non-plugged tool speed at which it is expected that the plurality of disk blades will rotate due to engagement with the field while the agricultural implement is being moved across the field at the current ground speed.

11. The agricultural implement of claim 9, wherein the controller is configured to control the operation of the rotational actuator such that the plurality of disk blades are rotationally driven for a predetermined time period in response to the determination that the disk gang is experiencing the plugged condition.

12. The agricultural implement of claim 9, wherein the controller is configured to control the operation of the rotational actuator such that the plurality of disk blades are rotationally driven at a rotational speed that is varied over time.

13. The agricultural implement of claim 9, further comprising a clutch configured to selectively engage and disengage the rotational actuator relative to the common shaft, the controller being configured to control an operation of the clutch to engage the rotational actuator with the common shaft in response to the determination that the disk gang is experiencing the plugged condition.

14. A method for de-plugging rotating ground engaging tools of an agricultural implement, the agricultural implement including a frame and first and second ground engaging tools configured to be supported relative to the frame such that a flow gap is defined between the first and second ground engaging tools, the method comprising:

receiving, with a computing device, data indicative of material accumulation within the flow gap defined between the first and second ground engaging tools;

determining, with the computing device, when the first and second ground engaging tools are experiencing a plugged condition based on the received data;

monitoring a current ground speed of the agricultural implement as the agricultural implement is being moved across the field during the performance of an agricultural operation; and in response to the determination that the first and second ground engaging tools are experiencing the plugged condition, controlling, with the computing device, an operation of a rotational actuator coupled to the first and second ground engaging tools such that the first and second ground engaging tools are rotationally driven while the first and second ground engaging tools are disposed at a working position relative to a soil surface of a field, wherein controlling the operation of the rotational actuator comprises controlling the operation of the rotational actuator such that the first and second ground engaging tools are rotationally driven at a rotational speed selected as a function of the current ground speed of the agricultural implement.

15. The method of claim 14, further comprising selecting the rotational based on a predetermined non-plugged tool speed at which it is expected that the first and second ground engaging tools will rotate due to engagement with the field while the agricultural implement is being moved across the field at the current ground speed.

16. The method of claim 14, wherein controlling the operation of the rotational actuator comprises controlling the operation of the rotational actuator such that the first and second ground engaging tools are rotationally driven for a predetermined time period in response to the determination that the first and second ground engaging tools are experiencing the plugged condition.

17. The method of claim 14, further comprising controlling an operation of a clutch provided in operative association with the rotational actuator to engage the rotational actuator with the first and second ground engaging tools in response to the determination that the first and second ground engaging tools are experiencing the plugged condition.

* * * * *